United States Patent Office 3,516,981
Patented June 23, 1970

3,516,981
MONO AZO REACTIVE DYESTUFFS
Henri Riat, Arlesheim, Raymond Gunst, Birsfelden, and Gerd Hoelzle, Liestal, Switzerland, assignors to Ciba Limited, Basel, Switzerland, a company of Switzerland
No Drawing. Continuation-in-part of application Ser. No. 319,979, Oct. 30, 1963. This application Mar. 3, 1967, Ser. No. 620,253
Claims priority, application Switzerland, Nov. 13, 1962, 13,259/62; Sept. 10, 1963, 11,131/63
Int. Cl. C09b 62/08; D06p 1/09
U.S. Cl. 260—153
6 Claims

ABSTRACT OF THE DISCLOSURE

Water soluble reactive cotton dyestuffs dyeing green and olive shades and containing an azodyestuff molecule and an antraquinone dyestuff molecule bond to a halogeno triazine nucleus.

---

This is a continuation-in-part of our application Ser. No. 319,979, filed Oct. 30, 1963, now abandoned.

The present invention provides new and valuable fiber-reactive dyestuffs that correspond to the formula:

(1)    R—N=N—R$_1$—X in which R represents a radical of a naphthalene-trisulfonic acid that is advantageously bound to the azo bridge in β-position, R$_1$ represents a benzene radical bound to the azo group in para-position to the group X, and X represents the radical of a 4-halogen-1:3:5-triazine bound in 2-position through an amino bridge, especially an —NH-bridge, which radical X contains the radical of a 1-aminoanthraquinone-2-sulfonic acid bound in 6-position through an amino group.

The dyestuffs of the invention can be manufactured by condensing a trihalogen-1:3:5-triazine, especially 2:4:6-tribromo- or 2:4:6-trichloro-1:3:5-triazine with an aminomonoazo dyestuff of the formula (2)    R—N=N—R$_1$—NH—C$_{m-1}$H$_{2m-1}$

in which R and R$_1$ have the meanings given in Formula 1 and m represents a positive integer 1, 2 or 3, and then with a 1-aminoanthraquinone-2-sulfonic acid to form a monohalogentriazine condensation product.

The dyestuff of the Formula 2 used as starting materials can be prepared by coupling diazotized 1- or 2-aminonaphthalene-trisulfonic acids, for example, 1-naphthylamino-2:4:7-, 2:4:8-, 2:5:7-, 3:6:8- or 4:6:8-trisulfonic acid and 2-naphthylamine-1:3:7-, 1:5:7-, 3:5:7-, 4:6:8- or 3:6:8-trisulfonic acid in a weakly acid medium with ortho- or meta-toluidine, cresidine, aminohydroquinone-dimethylether, ortho- or meta-anisidine, aniline, N-methylaniline, 3-acetylamino-1-aminobenzene, 3-propionylamino-1-aminobenzene, 3-acetylamino-2-methoxy-1-aminobenzene, 3-carbethoxy-amino-1-aminobenzene, 3-methanesulfonylamino-1-aminobenzene, 3-ureido-1-aminobenzene or with xylidines.

The diazotization of the aminonaphthalene trisulfonic acids indicated above for use in the preparation of the dyestuffs of the Formula 2 can be carried out by known methods, for example, with the aid of an inorganic acid, especially hydrochloric acid, and sodium nitrite. Coupling of the diazo compounds so obtained with the aforementioned aniline derivatives that couple in 4-position can likewise be carried out by known methods.

The condensation of the aminomonoazo dyestuffs so obtained with the cyanuric halide is carried out in such a manner that the resulting condensation product still contains two exchangeable halogen atoms, one of which is replaced by the radical of a 1-aminoanthraquinone-2-sulfonic acid by the process of the invention. As such compounds there may be mentioned, in addition to 1:4-diaminoanthraquinone-2-sulfonic acid, more especially 1-aminoanthraquinone-2-sulfonic acid of the formula:

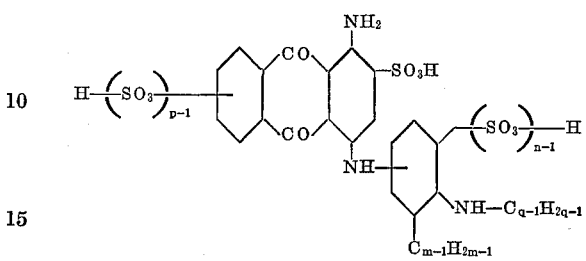

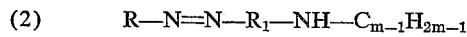

in which n, m, p and q each represents 1 or 2, n advantageously representing 2 and m, p and q each advantageously representing 1, for example, 1-amino-4-(3'-aminophenylamino) - anthraquinone - 4':2 - disulfonic acid, 1-amino-4-(4'-aminophenylamino) - anthraquinone - 3':2-disulfonic acid, 1-amino-4-(4'-methylaminophenylamino)-anthraquinone-3':2-disulfonic acid, 1-amino-4-(4'-aminophenylamino) - anthraquinone-2:2'-disulfonic acid, 1-amino-4-(3'- or 4'-aminophenylamino)-anthraquinone-2-sulfonic acid and 1-amino-4-(3'-amino-4-methylphenylamino)-anthraquinone-2-sulfonic acid. 1-amino - 4 - diphenylamino-anthraquinonesulfonic acids, for example the 1-amino-4-(4'-aminodiphenylamino) - anthraquinone-3',2-disulfonic acid, may also be used.

The dyestuff of the present invention may also be made by condensing the halogentriazine first with the aminoanthraquinone sulfonic acid to form a dihalogentriazine, which is subsequently reacted with a monoazo dyestuff of the Formula 2 to form a monohalogentriazine condensation product.

The condensation is carried out in the process of the invention advantageously in the presence of an agent capable of binding acid, for example, sodium carbonate or sodium hydroxide, and under conditions such that one exchangeable halogen atom remains in the finished product, that is to say, for example, in an organic solvent or at a relatively low temperature in an aqueous medium.

The dyestuffs obtained by the process of the invention are suitable for dyeing and printing a very wide variety of materials such as wool, silk, leather and polyamides, but more especially materials of fibrous structure that contain cellulose, for example, linen, regenerated cellulose and, above all, cotton. They are specially suitable for application by the so-called pad-dyeing process in which the material is impregnated with an aqueous dyestuff solution that may also contain salt, and the dyestuffs are then fixed by subjecting them to an alkali treatment, advantageously with the application of heat. This process and the direct dyeing processes, by which many of the dyestuffs prepared by the process of the invention can also be applied, yield valuable dyeings that are fast to washing. Fast prints are obtained by the printing processes.

Dyeings and prints produced with the new dyestuffs on fibers containing cellulose are generally distinguished by a good fastness to light and more especially by outstanding properties of wet fastness, particularly their fastness to washing being very good.

Furthermore, dyeings and prints obtained with the dyestuffs of the invention are generally distinguished by the fact that any dyestuff not chemically fixed to the fiber can readily be washed out. The printing pastes containing the dyestuffs of the invention are also generally distinguished by their stability to storing.

EXAMPLE 1

48.7 parts of a monoazo dyestuff obtained by coupling diazotized 2-naphthylamine- 4:6:8-trisulfonic acid with aniline-ω-methanesulfonic acid and subsequently splitting off the ω-methanesulfonic acid by means of a sodium hydroxide solution, were dissolved in 400 parts of water, and the solution neutralized with sodium hydroxide. A solution of 18.5 parts of cyanuric chloride in 60 parts of acetone was then added, and the mixture stirred while cooling with ice, the pH value being maintained between 5 and 7 by the addition of a dilute sodium hydroxide solution. After the condensation, a solution of 48.9 parts of 1 - amino-4-(4'-aminophenylamino)-anthraquinone-2:3'-disulfonic acid neutralized with sodium carbonate was added, and the whole heated to 50° C. in the course of 2 hours. The pH value was maintained between 5.5 and 6 by the gradual addition of a dilute sodium hydroxide solution. The mixture was kept at a temperature between 50 and 60° C. until the pH value did not change. The resulting monochlorotriazine dyestuff was then precipitated by the addition of sodium chloride, isolated by filtration and dried. It dyed cotton green tints fast to light that exhibited a high degree of fastness to washing.

In the following table are listed further examples of components which yield dyestuffs which can be obtained by the process described above when cyanuric chloride is first reacted with the monoazo dyestuffs listed in Column I and then with the blue anthraquinone derivatives listed in Column II. Column III indicates the tint obtained on cotton with the monohalogen triazine dyestuff.

| | I | II | III |
|---|---|---|---|
| 1 | 2-naphthylamine-4:6:8-trisulfonic acid→aniline. | 1-amino-4-(3'-amino-phenylamino)-anthraquinone-2:4'-disulfonic acid. | Green. |
| 2 | 2-naphthylamine-4:6:8-trisulfonic acid→1-amino-2:5-dimethylbenzene. | ___do___ | Do. |
| 3 | 2-naphthylamine-4:6:8-trisulfonic acid→1-amino-2-methoxy-5-methyl-benzene. | ___do___ | Yellowish green. |
| 4 | ___do___ | 1-amino-4-(4'-amino-phenylamino)-anthraquinone-2:3'-disulfonic acid. | Do. |
| 5 | 2-naphthylamine-4:6:8-trisulfonic acid→1-amino-3-acetylamino-benzene. | ___do___ | Do. |
| 6 | 2-naphthylamine-3:6:8-trisulfonic acid→1-amino-3-ureidobenzene. | ___do___ | Do. |
| 7 | ___do___ | 1-amino-4-(3'-amino-phenylamino)-anthraquinone-2:4'-disulfonic acid. | Do. |
| 8 | 1-naphthylamine-2:5:7-trisulfonic acid→1-amino-2-methoxy-5-methyl-benzene. | 1-amino-4-(4'-amino-phenylamino)-anthraquinone-2-sulfonic acid. | Do. |
| 9 | 2-naphthylamine-3:6:8-trisulfonic acid→1-amino-3-ureidobenzene. | ___do___ | Do. |
| 10 | 2-naphthylamine-4:6:8-trisulfonic acid→N-methyl-aniline. | 1-amino-4-(3'-amino-phenylamino)-anthraquinone-2:4'-disulfonic acid. | Green. |
| 11 | 2-naphthylamine-3:6:8-trisulfonic acid→1-amino-3-ureidobenzene. | 1:4-diaminoanthra-quinone-2-sulfonic acid. | Yellowish brown. |
| 12 | 2-naphthylamine-3:6:8-trisulfonic acid→1-amino-3-acetylamino-benzene. | 1-amino-4-(3'-amino-phenylamino)-anthraquinone-2:4'-disulfonic acid. | Yellowish green. |
| 13 | 2-naphthylamine-3:6:8-trisulfonic acid→1-amino-3-propionyl-amino-benzene. | 1-amino-4-(4'-amino-phenylamino)-anthraquinone-2:3'-disulfonic acid. | Do. |
| 14 | 2-naphthylamine-3:6:8-trisulfonic acid→1-amino-2-methoxy-5-acetyl-aminobenzene. | 1-amino-4-(3'-amino-phenylamino)-anthraquinone-2:4'-disulfonic acid. | Olive green. |
| 15 | 2-naphthylamine-4:6:8-trisulfonic acid→1-amino-3-carbethoxy amino-benzene. | 1-amino-4-(3'-amino-phenylamino)-anthraquinone-2:4'-disulfonic acid. | Yellowish green. |
| 16 | 2-naphthylamine-4:6:8-trisulfonic acid→1-amino-3-ureidobenzene. | 1-amino-4-(3'-amino-phenylamino)-anthraquinone-2:4'-disulfonic acid. | Do. |
| 17 | 1-naphthylamine-2:5:7-trisulfonic acid→1-amino-3-ureidobenzene. | 1-amino-4-(3'-amino-phenylamino)-anthraquinone-2:4'-disulfonic acid. | Do. |
| 18 | 2-naphthylamine-3:6:8-trisulfonic acid→1-amino-3-ureidobenzene | 1-amino-4-(4'-methyl-aminophenyl-amino)-anthra-quinone-2:3'-disulfonic acid. | Olive green. |
| 19 | ___do___ | 1-amino-4-(3'-amino-6'-methylphenyl-amino)-anthra-quinone-2:4'-disulfonic acid. | Yellowish olive. |
| 20 | ___do___ | 1-amino-4-(4'-amino-phenylamino)-anthraquinone-2:2'-disulfonic acid. | Yellowish green. |
| 21 | ___do___ | 1-amino-4-(4'-amino-diphenylamino)-anthraquinone-2:3'-disulfonic acid. | Yellowish olive. |
| 22 | ___do___ | 1:4-diaminoanthra-quinone-2:6-disulfonic acid. | Brown. |

EXAMPLE 2

A solution of 18.5 parts of cyanuric chloride in 60 parts of acetone was aded to a solution of 53.3 parts of the disodium salt of 1-amino-4-(4'-aminophenylamino)-anthraquinone-2:3'-disulfonic acid in 500 parts of water cooled with ice, the inorganic acid formed being neutralized by the dropwise addition of a dilute sodium hydroxide solution. An aqueous solution of 54.5 parts of a monoazo dyestuff prepared from diazotized 2-naphthyl-amine-3:6:8-trisulfonic acid and -1-amino-3-ureidobenzene was added to the dichlorotriazine compound thus formed. The mixture was gradually heated to 60° C., and then kept at that temperature for 4 hours. The reaction mixture was kept slightly acid to neutral by the dropwise addition of a sodium carbonate solution. The green dyestuff obtained was precipitated by the addition of potassium chloride and isolated by filtration. It dyed cotton yellowish green tints.

When 1-amino - 4 - (3' - aminophenylamino)-anthraquinone-2:4'-disulfonic acid was used as blue component, a dyestuff having similar properties was obtained.

Dyeing prescription 2 parts of the dyestuff obtained as described in the first paragraph of Example 1 were dissolved in 100 parts of water. A cotton fabric was impregnated with the solution thus obtained on a padding mangle and the fabric squeezed in such a manner that it retained 75% of dyestuff solution, calculated on its dry weight.

The impregnated cloth was dried and then impregnated at room temperature with a solution containing 10 parts of sodium hydroxide and 300 parts of sodium chloride per litre. The fabric was then squeezed till it retained 75% by weight of the liquor and steamed for 60 seconds at 100 to 101° C. The material was then rinsed, treated in a 0.5% sodium bicarbonate solution, rinsed, soaped at the boil for 15 minutes in a 0.3% solution of a non-ionic detergent, rinsed and dried. A dyeing fast to washing and light was obtained.

What is claimed is:
1. A dyestuff of the formula:

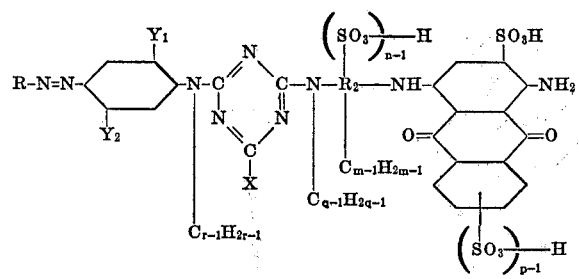

in which $R_2$ is phenylene, R is a member selected from the group consisting of 3,6,8-trisulfonaphthyl-2-, 4,6,8-trisulfonaphthyl-2-, 3,5,7-trisulfonaphthyl-2- and 2,5,7-trisulfonaphthyl-1-, $Y_1$ is a member selected from the group consisting of hydrogen, lower alkyl and lower-alkoxy, and $Y_2$ is a member selected from the group consisting of hydrogen, lower alkyl and a radical of the formula —NH—CO—$R_1$, wherein $R_1$ is a member selected from the group consisting of lower alkyl containing 1 to 4 carbon atoms, lower alkoxy containing 1 to 4 carbon atoms and amino, X is a member selected from the group consisting of chlorine and bromine, $m$, $n$, $p$ and $q$ each are a whole number of 1 to 2 and $r$ is a whole number of 1 to 3.

2. A monoazo dyestuff according to claim 1 of the formula:

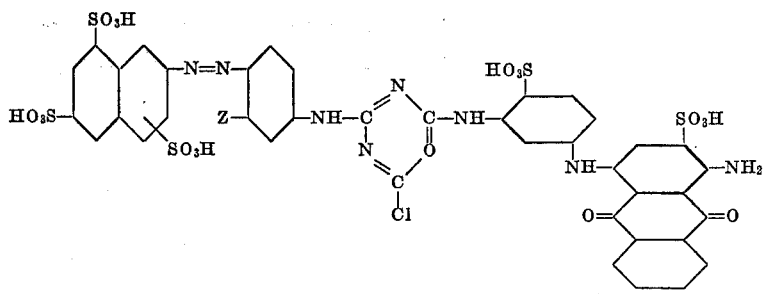

wherein Z is a member selected from the group consisting of hydrogen, ureido and alkanoylamino containing 1–4 carbon atoms.

3. The dyestuff according to claim 1 of the formula:

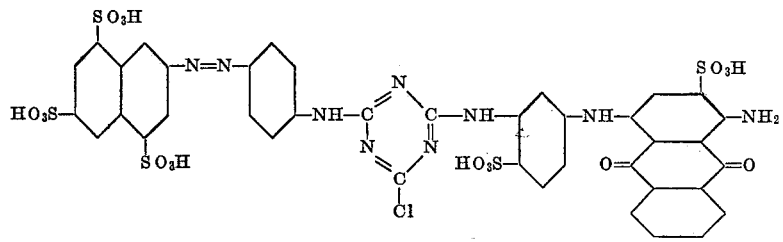

4. The dyestuff according to claim 1 of the formula:

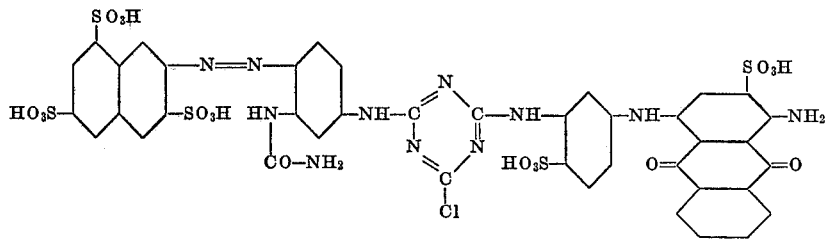

5. The dyestuff according to claim 1 of the formula:

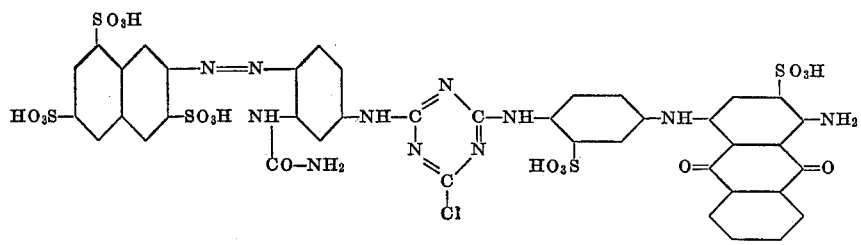

6. The dyestuff according to claim 1 of the formula:
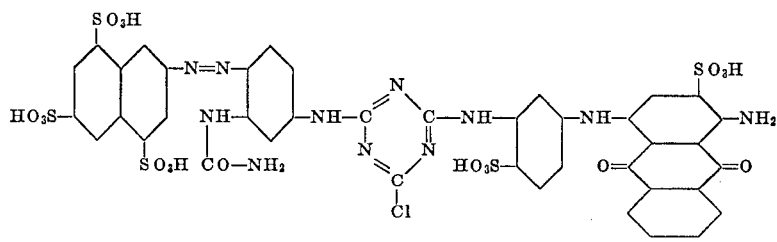
References Cited
UNITED STATES PATENTS
3,100,768   8/1963   Gunst _____ 260—153
CHARLES B. PARKER, Primary Examiner
D. M. PAPUGA, Assistant Examiner
U.S. Cl. X.R.
8—41, 54.2; 260—196, 378